United States Patent

[11] 3,601,168

[72] Inventor Gustaf Harry Fernström
Klinten, Sweden
[21] Appl. No. 838,515
[22] Filed July 2, 1969
[45] Patented Aug. 24, 1971
[73] Assignee Atlas Copco Aktiebolag
Nacka, Sweden
[32] Priority July 8, 1968
[33] Sweden
[31] 9364/68

[54] DRIVING TOOL FOR FASTENERS
8 Claims, 9 Drawing Figs.
[52] U.S. Cl. .................................................. 144/32,
227/149
[51] Int. Cl. .................................................. B25b 23/10,
B25c 1/00
[50] Field of Search .................................... 144/32;
227/136, 149

[56] References Cited
UNITED STATES PATENTS
1,815,525 7/1931 Shaw et al. .................... 144/32

2,664,121 12/1953 Travis ........................... 144/32
3,357,619 12/1967 Jeanfavre ..................... 227/149

Primary Examiner—Donald R. Schran
Attorney—Munson & Fiddler

ABSTRACT: In a driving tool for fasteners a driver has guide jaws releasably clamped thereagainst for holding a fastener in frontal alignment therewith. During driving movement of the driver together with said fastener towards a workpiece, the guide jaws, in response to said fastener striking against the workpiece, are arrested in spaced relation to the workpiece and knocked loose from the driver for releasing the fastener from the guide jaws while the driver continues its driving movement. The driving tool may be provided with a magazine for band-supported fasteners, which by an ejector are forced to break out laterally one by one from the band in between the guide jaws and by a feeder are moved together with the band one after the other to the ejector, said ejector and feeder being pivotally supported on a rocker member such as to alternately actuate the fasteners as the arm is rocked alternately in one direction and the other.

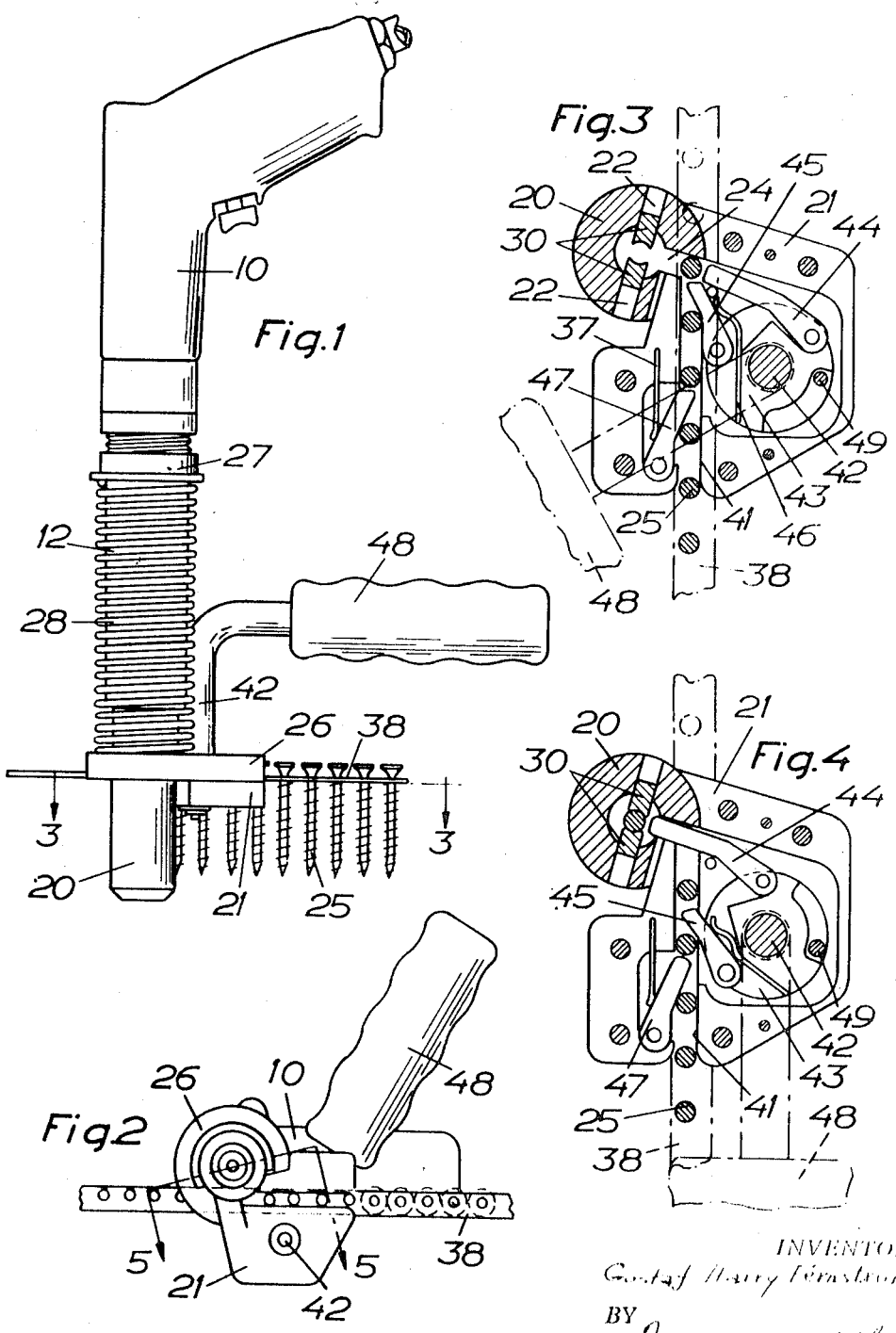

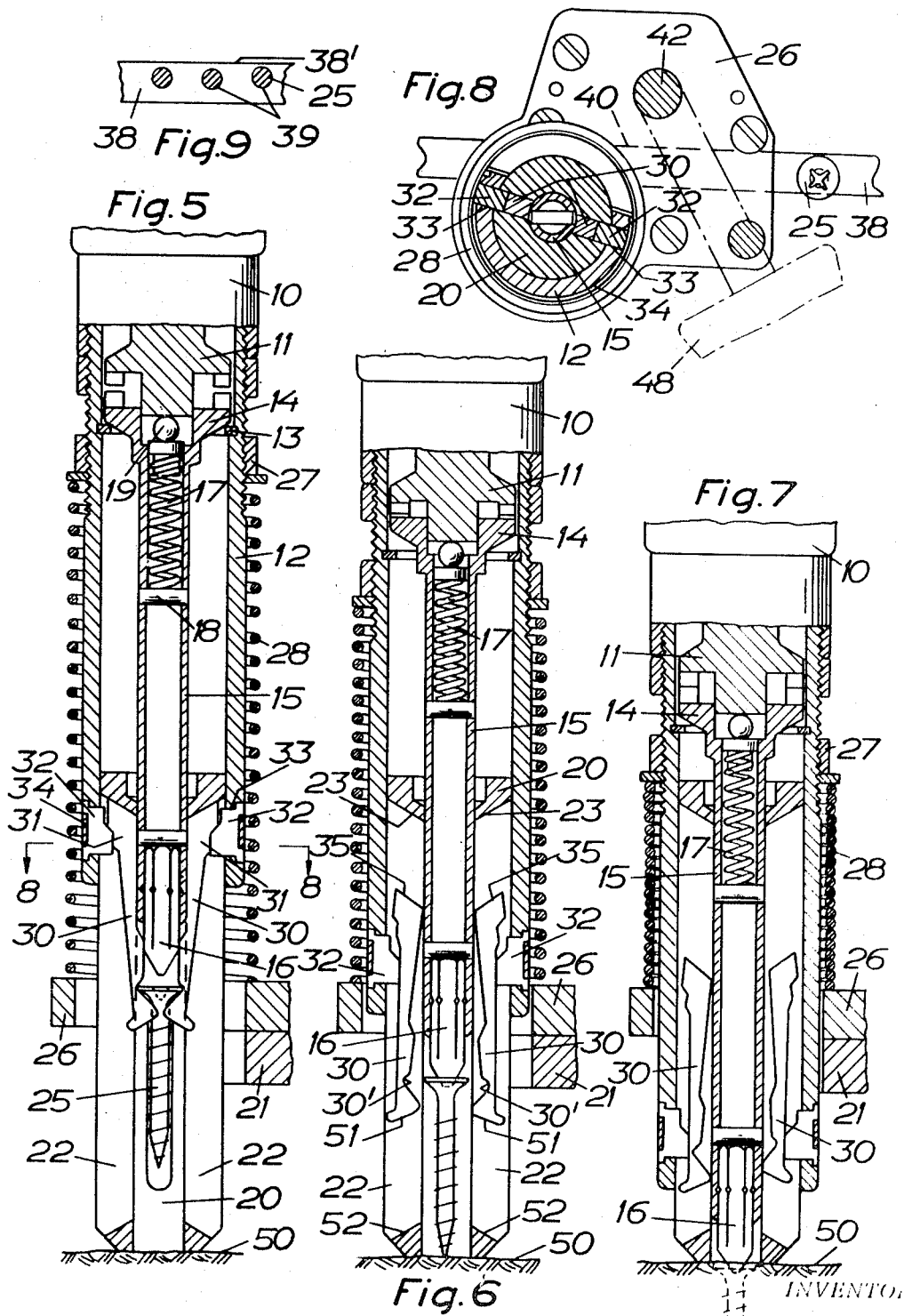

3,601,168

DRIVING TOOL FOR FASTENERS

This invention relates to a driving tool for fasteners and particularly to a driving tool for fasteners in which a driver is carried axially movably between retracted and extended positions in a guide body on which is provided a feed opening for feeding fasteners one after the other into frontal alignment with the driver in the retracted position thereof, guide jaws being axially movably arranged relative to the driver between projected conjunct position in which the guide jaws are arranged to grip and hold a fastener in front of the driver and a retracted separated position for releasing the fastener.

In such driving tools the guide jaws in a number of design solutions hitherto have been released by striking against cam or abutment surfaces on the guide body, the abutment surfaces being axially adjustable to selective predetermined fixed positions thereon relative to the driving tool. Since the distance between the abutment surfaces and the workpieces into which the fasteners are to be driven often may be subjected to considerable variation, there occurs, because of the fixed position of said abutment surfaces, the risk of canted impacting or loss of the fastener when the latter is released too early. In other solutions the jaws hit the workpiece for release thereby often causing undesirable denting or marring of the work surface. It is followingly the object of the invention to improve the advancement of the fastener to the workpiece by making the release of the guide jaws directly dependent on the position of the workpiece and to perform the release with the guide jaws safely spaced from the workpiece.

For these and other purposes there is according to one aspect of the invention provided a driving tool for fasteners comprising a guide body, a driver axially movably carried in said guide body between retracted and extended positions relative thereto, a feed opening on said guide body, means for feeding fasteners one after the other through said feed opening into frontal alignment with said driver in the retracted position thereof, guide jaws axially movable relative to said driver in said guide body between projected conjunct position on said driver for holding a fastener thus fed by said feeding means in front of said driver and a separated position in said guide body loose from said driver for releasing said fastener, releasable holding means in said driving tool movable in conjunction with said driver for clamping said guide jaws against said driver in said projected conjunct position of said guide jaws during driving movement of said driver together with said fastener held in front thereof towards a workpiece into which said fastener is to be driven, and surfaces on said guide jaws cooperating with said fastener held therebetween for arresting said guide jaws in spaced relation to said workpiece and for knocking them loose from said driver by release of said holding means the instant said fastener strikes against said workpiece during the driving movement of said driver. The invention also relates to a driving tool magazine for band-supported fasteners, more particularly for a driving tool of the abovementioned character in which a driver is carried axially movably in a guide body and a feeder is arranged in said magazine to bring the fasteners of the band, one after the other, forward to a feed opening while an ejector in said magazine is arranged to push the fasteners having thus been brought forward, out of the band via the feeding opening into the path of movement of the driver.

In such magazines the band has hitherto normally been directed to intersect the path of movement of the driver at which instant interference can occur as a result of broken-out band fragments following and subsequently jamming the movement of the driver. In prior use of magazine ejectors in combination with a band avoiding said path, the hitherto constructional suggestions have been complicated and costly. It is followingly an object of the invention to substantially simplify the construction of driving tool magazines of the character in question here by a simple and handy combination of the ejection and feeding functions.

For the hereinabove mentioned and other purposes there is according to another aspect of the invention provided in a driving tool including guide body, a driver axially movably carried in said guide body, and a feed opening on said guide body, a driving tool magazine for supplying fasteners supported by a band one after the other through said feed opening into the path of movement of said driver, said magazine comprising a housing, a rocker member pivotally journaled in said housing adjacent said guide body in a plane transverse to said driver, an ejector movably mounted in said housing pivotally on the one end of said rocker member for pushing a leading fastener out of the band via said feed opening into the path of movement of said driver when said one end is rocked towards said feed opening and for retracting said ejector when rocked away from said feed opening, a feeder movably mounted in said housing pivotally on the other end of said rocker member for feeding forward the next fastener in said band to said feed opening when said other end is rocked towards said feed opening and for retracting said feeder when rocked away from said feed opening, and means for alternately rocking the ends of said rocker member towards and away from said feed opening.

The above and other purposes of the invention will become obvious from the following description and from the accompanying drawings in which an embodiment of the invention is illustrated by way of example. It should be understood that this embodiment is only illustrative of the invention and that various modifications thereof may be made within the scope of the claims.

In the drawings,

FIG. 1 shows a side view of a driving tool embodying the invention.

FIG. 2 is a front view of the driving tool in FIG. 1.

FIG. 3 is an enlarged view partly in section on the line 3—3 in FIG. 1.

FIG. 4 is a view corresponding to FIG. 3 but showing another position of the details involved therein.

FIG. 5 is a longitudinal enlarged section of the forward portion of the driving tool seen on the line 5—5 in FIG. 2.

FIGS. 6 and 7 show the details in FIG. 5 during driving of a fastener.

FIG. 8 is a view shown partly in section on the line 8—8 in FIG. 5.

FIG. 9, finally, shows a fragmentary top view of a feed band for the driving tool.

In the figures the numeral 10 designates a hand-sustained driving tool such as a nailing machine or a powered screwdriver. As an example suitable for description has been chosen the latter alternative, the screwdriver 10 including a conventional pressure fluid-driven vane motor, not shown, which over a suitable gearing, likewise not shown, drives the driving clutch part 11 in a clutch 11, 14, FIG. 5. At the forward end of the screwdriver 10 is threadedly affixed a forwardly directed, partly cutaway outer sleeve 12, in the interior of which is fixed a rearwardly disposed stop ring 13. The driven clutch part 14 cooperating with the clutch part 11 abuts, when in uncoupled nonrotating position, against the stop ring 13. The clutch part 14 carries an elongated driver 15 arranged in the outer sleeve 12, which driver 15 in the screwdriver application in question here carries a bit 16 forwardly thereon intended for cooperation with screws or fasteners 25 provided with screwdriving grooves. Between the driving clutch part 11 and the driven clutch part 14 is inserted a spring 17 which bears against a cross-pin 18 in the interior of the driver 15 and against the driving clutch part 11 through the intermediary of a ball 19. The spring 17 normally moves the clutch parts 11, 14 apart, at which instant the driven clutch part 14 abuts against the stop ring 13 without rotating, while the ball 19 makes possible full rotation of the driving clutch part 11 with respect to the clutch part 14.

The driver 15 projects axially slidably and rotatably into a guide body 20 which is made in one piece with a magazine housing 21 disposed transversely and perpendicularly thereagainst. The guide body 20 is arranged slidably in the outer sleeve 12 and is provided with a pair of long axial slots 22 which at the rear are terminated by canted abutment surfaces 23. The guide body 20 is provided with a feed opening 24 for insertion of fasteners 25. The housing 21 is covered by a cover 26 affixed thereto by screws and between the cover 26 and a setting nut 27, which is threadedly and axially adjustable supported on the outer sleeve 12, is inserted a helical spring 28 striving to move the guide body 20 to a projected position with respect to the outer sleeve 12 at which instant the driver 15 with the bit 16 takes retracted position within the guide body 20, FIG. 5.

In the slots 22 of the guide body 20 is loosely inserted a pair of elongated guide jaws 30 each of them rearwardly provided with a thickened end stop portion presenting a radially outward wedge abutment 31 adjacent and in front of the end stop portion. A holding means for the guide jaws 30 consists of a pair of wedge jaws 32 each inserted in an opening 33 arranged diametrically in the outer sleeve 12 and being biased radially inwardly by a spring ring 34 around the outer sleeve 12. The holding means consisting of the wedge jaws 32 is intended for keeping the guide jaws 30 under spring pressure against the driver 15 in axially slidable abutting and nonrotating relation relative thereto in the slots 22. In such abutting position the forward ends of the guide jaws 30 are disposed in a projected, resiliently brought-together or conjunct position in front of the bit 16 longitudinal the driver 15, the guide jaws 30 thus being able to clamp, by way of an encircling laterally applied gripping action a fastener 25 that has been inserted in between the guide jaws 30 through the feed opening 24 such as to keep the fastener in position in frontal alignment with the bit 16 of the driver 15 during movement of the latter from retracted to projected position in the guide body 20. The gripping action is achieved by way of suitable engaging surfaces cooperating with the fastener 25 to be gripped. Thus in case of headed fasteners 25, the guide jaws are provided with suitable V-shaped recesses 30 adapted to the screwheads.

The guide jaws 30 may be retracted and knocked loose with respect to the wedge jaws 32 with the latter leaving and releasing the wedge abutments 31 and the guide jaws 30 sliding up on the driver 15 taking retracted separated position relative thereto, FIGS. 6, 7. In such position the guide jaws 30 lie freely separated loosely in the slots 22 with the wedge jaws 32 disposed radially outwardly of the guide jaws 30 rearwardly of front stop lugs thereon. The wedge jaws 32 cooperate with the wedge abutments 31 and are pushed up on said abutments against the thickened rear end stops of the guide jaws 30 to stop forward projection of the guide body 20 relative to the outer sleeve 12 due to the action of the helical spring 28. At such projection the abutment surfaces 23 of the slots 11 cooperate with rear end surfaces 35 on the guide jaws 30 so that the guide jaws 30 are moved forwardly in between the wedge jaws 32 to projected conjunct position relative to and against the driver 15.

It is preferred to insert the fasteners 25 in a feed band 38 of plastic material, preferably polyethylene, provided with longitudinally spaced holes 39 into which the fasteners 25 are pushed perpendicularly relative to the band 38, the holes 39 being arranged immediately adjacent one edge 38 of the band 38 so that it will be possible to project the fastening means 25 laterally out of the band while breaking through the edge portion thereof at the holes 39 when the fastening means 25 are to be moved through the feed opening 24 into the guide body. The cover 26 of the housing 21 is provided with a through guide passage 40, FIG. 8, for the band 38 and the housing 21 has a feeding slot 41, FIG. 3, for slidingly supporting the stems of fasteners 25, said slot 41 running perpendicularly to the guide passage 40. The feeding slot 41 is terminated at the feed opening 24. On the feed housing 21 and the cover 26 thereof is carried pivotally a journal 42 to which is affixed an outer operating lever 48. The journal 42 carries nonrotatably thereon a rocker member or arm 43 within the feed housing 21 which can be pivoted on the journal 42 between two limit positions, FIG. 3 and 4, respectively, defined by a stop pin 49 in the housing 21. At opposite sides of the journal 42 the arm 43 carries respectively an ejector 44 and a feeder 45, both of them being pivotally journaled on the arm 43. A plate spring 46 on the arm 43 strives to move the feeder 45 in between the fastener 25 in the feeding slot 41. When the operating lever 48 is pivoted manually to rock the arm 43 in one direction, for example counterclockwise from the position in FIG. 3 to the position in FIG. 4, the ejector 44 is driven into the feed opening 24 feeding a fastener 25 by the stem thereof into the path of movement of the driver 15 and in between the guide jaws 30 and the recesses 30, FIG. 5, thereof. Simultaneously therewith the feeder 45 is moved back one step passing over the next fastener stem in the band 38. In case of need, the band 38 is prevented from retreating out of the guide passage 40 by an arresting dog 47 in the feed housing 21 which dog is moved by a plate spring 37 lockingly in behind the stem of the next fastener 25, the one after the other, as the feeder 45 brings them forward to the feeding slot 41. When pivoting the operating lever 48 for rocking the arm 42 clockwise from the position in FIG. 4 to the position in FIG. 3, the feeder 45 pushes forward the next fastener to the feed opening 24 simultaneously with the ejector 44 being drawn out therefrom.

With the ejector 44 thus having placed a fastener 25 between the guide jaws 30, the driving tool 10 will be started so that the driving clutch part 11 starts rotating. Thereupon the guide body 20 is placed against the workpiece and the driving tool 10 is forced forwardly against the action of the helical spring 28. This causes the outer sleeve 12 to move forward with respect to the stationary guide body 20, during which movement the fastener 25 being held between the guide jaws 30 follows the driver 15 and the outer sleeve 12 since the wedge jaws 32 force the guide jaws 30 radially inwardly frictionally against the driver 15. When the workpiece 50 is contacted, the workpiece being for example a plasterboard or a sheet metal panel, the fastener 25 is stopped dead in the forward motion thereof together with the guide jaws 30 while the wedge jaws 32 together with the outer sleeve 12 continue in forward direction together with the driving tool 10. Friction and cam action between the guide jaws 30 and the driver 15 causes that the driver 15, as well, tends to move rearwardly under compression of the spring 17, the spring force of which and the distances between the parts involved being calculated such that the driven clutch part 14 will mate with the driven clutch part 11 simultaneously with the wedge jaws 32 sliding down from the wedge abutments 31 on the guide jaws 30 and the latter moving apart and being knocked loose from the wedge jaws 32 thus released. The driver 15 starts rotating and the tip of its bit 16 rotates the fastener 25 by way of the driving groove therein. The mated position reached is illustrated in FIG. 6 and the released guide jaws 30 are lying nonrotatably in their slots 22 in the stationary guide sleeve 20 while the fastener 25 is screwed down into the workpiece 50 into a predrilled hole therein by way of self-tapping or self-drilling. In FIG. 7 is illustrated the end stage of the driving, at which instant the increasing rotational resistance due to the screwhead penetrating into the workpiece 50 causes the clutch parts 11, 14 to disengage by conventional mechanism, not shown, and causes the rotation of the driver to cease. As an alternative and in case of pliable workpieces the setting nut 27 is adjusted such as to set the turns of the helical spring 28 to bear against one another just prior to the instant the head of the fastener has been screwed down fully into the workpiece, the compressed spring windings thereby providing a forward limit stop for the driving tool 10. As a continuation the final driving of the screw head is then completed simultaneously with the clutch parts 11, 14 being disengaged from one another, the driver 15 being released when the head has been driven home.

When the driving tool 10 is retracted from the workpiece, the helical spring 28 expands retracting the outer sleeve 12 and the driver 15 with respect to the guide body 20 and housing 21. During such movement the guide jaws 30 are taken rearwardly by the wedge jaws 32 engaging the thickened rear end stop thereon on towards the abutment surfaces 23, against which the rear end surfaces 35 of the guide jaws 30 come to rest simultaneously with the wedge jaws 32 sliding up on the wedge abutment surfaces 31. As a result the guide jaws 30 are subjected to spring load radially inwardly taking conjunct projected position for the next driving cycle, FIG. 5, in front of the driver 15 and its bit 16. In such position the operating lever 48 of the driving tool magazine will be rocked to and fro for feeding forward the next fastener 25 in between the guide jaws 30 as described hereinabove.

If it is desired to remove a fastener 25 that has been inserted between the guide jaws 30 away from the guide body 20 without driving it home, the magazine housing 21 is retracted manually towards the driving tool 10 to such an extent that front end surfaces 51 on the guide jaws 30 are struck by canted-forward end surfaces 52 of the axial slots 22. As a result the guide jaws 30 are moved to retracted separated position and the fastening means 25 falls out.

Obviously the guide jaw arrangement of the invention may advantageously be applied in driving tools without rotation, as well, primarily in tools for driving band-supported nails or in tools wherein the nails are supplied in between the guide jaws 30 in other way.

I claim:

1. A driving tool for fasteners comprising a guide body, a driver axially movably carried in said guide body between retracted and extended positions relative thereto, a feed opening on said guide body, means for feeding fasteners one after the other through said feed opening into frontal alignment with said driver in the retracted position thereof, guide jaws axially movable relative to said driver in said guide body between projected conjunct position on said driver for holding a fastener thus fed by said feeding means in front of said driver and a separated position in said guide body loose from said driver for releasing said fastener, releasable holding means in said driving tool movable in conjunction with said driver for clamping said guide jaws against said driver in said projected conjunct position of said guide jaws during driving movement of said driver together with said fastener held in front thereof towards a workpiece into which said fastener is to be driven, and surfaces on said guide jaws cooperating with said fastener held therebetween for arresting said guide jaws in spaced relation to said workpiece and for knocking them loose from said driver by release of said holding means the instant said fastener strikes against said workpiece during the driving movement of said driver.

2. A driving tool according to claim 1 in which said holding means is carried by an outer sleeve movable in conjunction with said driver and axially slidably surrounding said guide body.

3. A driving tool according to claim 2 in which there are provided spring means between said guide body and said outer sleeve for biasing said driver to said retracted position thereof in said guide body.

4. A driving tool according to claim 1 in which said guide jaws are loosely supported in longitudinal slots in said guide body extending sidewise along the path of movement of said driver, said holding means including wedge jaws radially movably guided in openings in said outer sleeve and extending into said slots, annular spring means on said outer sleeve for biasing said wedge jaws inwardly into said slots, and abutments radially outwardly on said guide jaws cooperating with said wedge jaws for keeping said guide jaws releasably in said projected conjunct position clamped between said wedge jaws and said driver.

5. A driving tool according to claim 1 in which there are provided rear abutments on said guide body cooperating with said guide jaws for arresting them in a rearward movement thereof to be reclamped against said driver by said holding means returning together with said driver to the retracted position of the latter, said holding means engaging said guide jaws for said rearward movement thereof.

6. A driving tool according to claim 4 in which said slots are terminated by rear abutments cooperating with the rear ends of said guide jaws for arresting them in a rearward movement thereof to be reclamped against said driver by said wedge jaws returning together with said driver to the retracted position of the latter, said wedge jaws having means thereon engaging said guide jaws for said rearward movement thereof.

7. A driving tool according to claim 4 in which said guide jaws are elongated bodies having opposed end surfaces thereon, there being provided front and rear abutments at the opposed ends of said slots cooperating with said end surfaces for knocking said guide jaws respectively to said separated retracted position in an extreme forward position of said driver when said fastener fails to strike against a workpiece, and to said projected conjunct position in said retracted position of said driver.

8. A driving tool according to claim 1 in which said fastener is a screw provided with driving groove means, a rotary driving clutch part axially fixed in said driving tool, a driven clutch part connected to said driver and having limited axial movability together therewith in said driving tool between a rearward position in engagement with said driving clutch part for rotating said driver and a forward release position, spring means between said clutch parts for urging said driven clutch part to said release position, a screwdriving bit on said driver for engaging said driving groove means of said fastener simultaneously with said driven clutch part being moved to said rearward position thereof as a result of said fastener striking said workpiece, and slots in said guide body extending sidewise along the path of movement of said driver for supporting said guide jaws therein nonrotatably relative to said driver.